United States Patent [19]

Jamaluddin et al.

[11] Patent Number: 5,425,422
[45] Date of Patent: Jun. 20, 1995

[54] PROCESS FOR REMOVING AND PREVENTING NEAR-WELLBORE DAMAGE DUE TO ASPHALTENE PRECIPITATION

[75] Inventors: Abul K. M. Jamaluddin, Pointe-Claire; Taras W. Nazarko, Calgary, both of Canada

[73] Assignee: Noranda Inc., Toronto, Canada

[21] Appl. No.: 124,224

[22] Filed: Sep. 21, 1993

[51] Int. Cl.$^6$ .................. E21B 37/00; E21B 37/06; E21B 43/40

[52] U.S. Cl. .................. 166/267; 166/303; 166/304; 166/312; 507/90

[58] Field of Search ............... 166/267, 279, 303, 304, 166/312, 371; 252/8.552; 507/90

[56] References Cited

U.S. PATENT DOCUMENTS

| | | | |
|---|---|---|---|
| 1,448,997 | 3/1923 | Foggan | 166/304 |
| 4,418,752 | 12/1983 | Boyer et al. | 166/267 |
| 4,465,138 | 8/1984 | Hunt, III | 166/303 |
| 4,756,368 | 7/1988 | Ikuta et al. | 166/371 X |
| 4,919,207 | 4/1990 | Ikuta et al. | 166/267 |
| 5,139,088 | 8/1992 | De Boer et al. | 166/267 |

OTHER PUBLICATIONS

Database WPI, Week 9133, Derwent Publications Ltd., London GB; AN 91-243962/33, Nov. 30, 1990.
Database WPI, Week 9235, Derwent Publications Ltd., London GB; AN 92-290590/35, Sep. 30, 1991.
Database WPI, Week 9228, Derwent Publications Ltd., London GB; AN 92-232593/28, Oct. 7, 1991.
Database WPI, Week 9224, Derwent Publications Ltd., London GB; AN 92-198209/24, Sep. 15, 1991.
Database WPI, Week 9205, Derwent Publications, Ltd., London GB; AN 92-039228/05, Feb. 23, 1991.
Can. J. Chem. Eng., 1985, 63, 878-885.
J. Can. Petroleum Tech., 1992, 31(4), 24-30.
Fuhr et al., Proceedings of the 4th UNITAR/UNDP International Conference on Heavy Crude and Tar Sands, Aug. 7-12, 1988, pp. 637-646, Paper No. 75.
Newberry et al. in the proceedings of the Society of Petroleum Engineers Symposium in Oklahoma City, Okla., Mar. 10-12, 1985, Paper SPE 13796.
Douglass et al. in the proceedings of the Society of Petroleum Engineers Regional Meeting in Billings, Mont., May 19-21, 1986, Paper SPE 15167.
Akbar et al. in the proceedings of the Society of Petroleum Engineers Middle East Technical Conference and Exhibiton, Manama, Bahrain, Mar. 11-14, 1989, Paper SPE 17965.
Monger et al. in the proceedings of the Society of Petroleum Engineers 63nd Annual Technical Conference and Exhibiton in Houston, Tex., Oct. 2-5, 1988, Paper SPE 18063.
Thaver et al. in the proceedings of the Society of Petroleum Engineers Internatinoal Symposium on Oil Field in Houston, Tex., Feb. 8-10, 1989, Paper SPE 18473.
Addison, in the proceedings of the Society of Petroleum Engineers Production Operations Symposium in Oklahoma City, Okla., Mar. 13-14, 1989, Paper SPE 18894.

(List continued on next page.)

*Primary Examiner*—George A. Suchfield
*Attorney, Agent, or Firm*—Fitzpatrick, Cella, Harper & Scinto

[57] ABSTRACT

In accordance with the present invention, there is now provided a method for removing asphaltene deposits in a well environment such as the wellbore and near-wellbore regions, comprising the injection of deasphalted oil therein to solubilize the asphaltene deposits obstructing the well environment. More specifically, the method of the invention comprises the injection of deasphalted oil into the wellbore and the near-wellbore formation followed by a soaking period and a production period. The method of the present invention has the great advantage of readily dissolving precipitated asphaltene in a well environment without other costly treatments such as the use of solvents like xylene or toluene. Furthermore, the present method does not require the incorporation of any additives in the deasphalted oil.

18 Claims, No Drawings

OTHER PUBLICATIONS

Trbovich et al. in the proceedings of the Society of Petroleum Engineers International Symposium on Oil Field Chemistry in Anaheim, Feb. 20–22, 1991, Paper SPE 21038.

Leontaritis et al. in the proceedings of the Society of Petroleum Engineers Intl. Symposium on Formation Damage Control in Lafayette, La., Feb. 26–27, 1992, Paper SPE 23810.

Samuelson et al., in the proceedings of the Society of Petroleum Engineers Intl. Symposium on Formation Damage Control in Lafayette, La., Feb. 26–27, 1992, Paper SPE 23816.

Chang et al. in the proceedings of the Society of Petroleum Engineers International Symposium on Oilfield Chemistry in New Orleans, La., Mar. 2–5, 1993, Paper SPE 25185.

Bernadiner in the proceedings of the Society of Petroleum Engineers Intl. Symposium on on FOilfield Chemistry in New Orleans, La., Mar. 2–5, 1993, Paper SPE 25192.

Database WPI, Week 9132, Derwent Publications Ltd., London, GB; AN 91-236081/32, Sep. 15, 1990.

PROCESS FOR REMOVING AND PREVENTING NEAR-WELLBORE DAMAGE DUE TO ASPHALTENE PRECIPITATION

FIELD OF THE INVENTION

The present invention is concerned with a method of preventing and/or removing asphaltene deposits in the wellbore and near-wellbore regions of a well.

BACKGROUND OF THE INVENTION

Asphaltene is defined as the fraction of crude oil insoluble in n-heptane, and composed of nitrogen, oxygen, and sulphur atoms in addition to carbon and hydrogen. Asphaltenes are polar molecules which aggregate together through aromatic $\pi-\pi$ orbital association, hydrogen bonding, and acid-base interactions. At the molecular level, asphaltenes consist of n-alkyl chains attached to aromatic rings and n-alkyl bridges connecting two aromatic rings. In both cases, the alkyl group distribution is predominated by the lower hydrocarbon chain lengths.

Asphaltenes generally deposit on pore-containing clay materials in the form of solid deposits or dark sludges. The solid deposits probably result from the growth of asphaltene aggregates on existing surfaces while the sludges are probably formed as large aggregates in solution, which settle out and drag other components out with them. These latter deposits cause serious problems anywhere in the oil production circuit.

In the formation, asphaltene deposition affects oil production in several ways. Pore throats become blocked thus reducing permeability. The formation can also become more oil-wet, changing the relative-permeability relationships. Asphaltene may promote water-in-oil emulsions, leading to much higher viscosities. In the wellbore, asphaltene deposits gradually reduce the area for flow. This results in the need for higher pressure drops to maintain production at an acceptable level. Deposition in downhole safety valves may interfere with their proper operation. Build up in the tubing may damage wireline tools or require different running procedures.

Heavy oils typically contain higher quantities of asphaltenes than conventional oils. Some heavy oils are mobile at reservoir conditions and are produced by primary recovery processes. Most asphaltene deposits in heavy oil are found in unconsolidated formations. Wells that are producing heavy oils often encounter operational problems including well sanding, and rod and tubing parting. Hence, these wells require frequent workovers. Usually, a condensate blend, i.e., a mixture of light hydrocarbons, is used as a workover fluid. Some wells lose their productivity immediately after such workover operation, because the light hydrocarbons in the condensate blend dissolve the heavy oil which may contain up to 20% asphaltenes. This dissolution of heavy oil into the condensate blend disturbs the equilibrium conditions of the asphaltene molecules, which ultimately precipitate. The presence of mobile formation sand around wellbores, along with sludge-type asphaltene precipitates, creates conditions leading to severe near-wellbore formation damage, and eventual termination of the well.

Many oil companies are looking at chemical alternatives to clean up deposits such as asphaltene deposits and prevent their formation. The solvents used most frequently are toluene and xylene. In recent years, research has been looking for alternative solutions because of increasing environmental restrictions and costs related to the use of these solvents. The most common procedure presently used for cleaning facilities and downhole tubing is mechanical scraping. However, it is obvious that this method is totally inappropriate for near-wellbore formation rejuvenation.

Acidizing wells for cleanup or stimulation purposes has resulted in the precipitation of asphaltenes. The pH variation changes the local chemical equilibrium, and causes an elevation of the concentration of some ions, such as iron. The predominant form of asphaltic deposit found after acidizing is iron/asphaltene sludge.

Enhanced oil recovery techniques have also led to asphaltene deposition problems. The use of water floods or $CO_2$ floods upsets the internal balance within the native oil, while brine increases solids precipitation. The use of $CO_2$ can support asphaltene solubility to a certain extent in dead oil. However, in a live oil, which contains solution gas, $CO_2$ destabilizes asphaltenes.

It has also been proposed to use co-solvents for asphaltene removal and prevention of re-occurrence. The preferred solvent was described as a xylene-enriched material with water-wetting properties using moderate-length carbon-chain alcohols. Production recovery was comparable to xylene alone and production improvement was stable for several months (see *Society of Petroleum Engineers, paper #21038*, 1991, 393).

The use of diesel solvents such as "DP-40" and "DC-40" is described in *Can. J. Chem. Eng.*, 1985, 63, 878. These substances do not however have the solvating power of xylene, but they resolve local problems without drawing asphaltene deposits from other areas to the area to be cleaned up.

The solvating powers of gas oil, high-aromatic diesel fuel and low-aromatic diesel fuel were also compared to that of toluene. Without co-solvents, the high-aromatic diesel fuel had a higher threshold to flocculation (i.e., more solvent could be added to the oil before the onset of flocculation) than that of toluene; the gas oil had a threshold only slightly lower than that of toluene. The use of additives did not enhance the solvating power of the diesel fuel. In studying the effects of light gases on asphaltene precipitation from heavy oils, it was noted that any precipitated asphaltene could be re-dissolved by adding more heavy oil (*J. Can. Pet. Tech.*, 1992, 31, 24). However, this would be possible only if the heavy oil was undersaturated with asphaltene materials.

Various processes have been proposed in the patent literature to overcome asphaltene related problems. For example in Soviet Union patent 1,680,748, the use of a mixture of methanol, colophony, and surfactant is disclosed to remove asphaltene, resin, and paraffin deposits.

In Soviet Union patent 1,682,374, the use of a mixture of salt deposits inhibitor, non-ionic surfactant, hydrochloric acid, and water was suggested for asphaltene-resin-paraffin removal.

In Soviet Union patent 1,677,050, it is stated that a mixture of vat residue from butyl alcohol production (containing butyl esters, butanol butyrates, di- and poly-alcohols, butyrals, monoglycol ethers, and high-boiling-point oxygen) and heavy pyrolytic resin successfully removed asphaltene-resin-paraffin deposits.

In U.S. Pat. No. 5,104,556, a mixture of kerosene and alkyl phenol is claimed to be effective in dissolving asphaltenic and paraffinic deposits. Similar disclosure of a mixture of kerosene, chromium anhydride, lower alcohol, and water is found in Soviet Union patent 1,629,493.

Soviet Union patent 1,609,807 describes the removal of asphalt, tar, and paraffin deposits from oil wells using a mixture of gas benzene, oxylated alkylphenol, glycerine, polyacrylamide, and water.

In Soviet Union patent 1,592,478, injection of a hydrocarbon solution of benzene and a specified acidic hydrocarbon emulsion is suggested for asphaltene-resin removal from the wellbore.

In U.S. Pat. No. 5,139,088, asphaltene precipitation in the flow path of an oil production well is claimed to be inhibited by injecting a heavy fraction of crude oil having a relatively high aromaticity and molar weight. The heavy fraction is obtained by separating the light fraction containing gaseous and oil components having a relatively low aromaticity and molar weight from the produced oil stream. However, the previously precipitated asphaltene can only be solubilized in the heavy fraction if such heavy fraction is undersaturated in asphaltene component.

In U.S. Pat. No. 4,465,138, a cyclic thermal solvent recovery method utilizing visbroken produced crude is disclosed. In this method, heavy oil is subjected to visbreaking operation to produce lower viscosity heavy oil. Subsequently, the hot visbroken oil is injected into the formation as a solvent and allowed to undergo a soaking period, and the well is subsequently returned to production. This method relates to the enhanced oil recovery (EOR) technique. The primary objective of this process is to reduce in situ heavy oil viscosity by injecting hot visbroken heavy oil instead of chemical solvents which are expensive and environmentally unfriendly.

In view of the foregoing, it becomes obvious that there is a great need for an improved method permitting the revival of wells closed due to wellbore or near-wellbore obstruction caused by asphaltene deposits. It would therefore be highly desirable to develop a method of dissolving asphaltene deposits which is not harmful to the environment. Such method would take advantage of the relative solubility of asphaltene in crude oil in order to restore oil production from a closed well in a short period of time.

SUMMARY OF THE INVENTION

In accordance with the present invention, there is now provided a method for removing asphaltene deposits in a well environment such as the wellbore and near-wellbore regions, comprising the injection of deasphalted oil therein to solubilize the asphaltene deposits obstructing the well environment. More specifically, the method of the invention comprises the injection of deasphalted oil into the near-wellbore formation followed by a soaking period and a production period. The method of the present invention has the great advantage of readily dissolving precipitated asphaltene in a well environment without other costly treatments such as the use of solvents like xylene or toluene. Furthermore, the present method does not require the incorporation of any additives in the deasphalted oil.

In an aspect of the invention, deasphalted oil is injected at a temperature ranging from 20°-100° C. to increase the solubilizing power of asphaltene particles. The deasphalted oil can be any oil from which the natural asphaltene or asphalt components have been removed.

In yet another aspect of the invention, the deasphalted oil is obtained directly from the well to be treated, and the deasphalting of the crude oil is realized by precipitating asphaltene molecules with n-pentane. Deasphalted oil can also be obtained from oil-refining or heavy oil upgrading processes.

In another aspect of the invention, the occurence of damages to the wellbore can be prevented by injecting deasphalted oil before too much asphaltene deposition occurs.

DETAILED DESCRIPTION OF THE INVENTION

It has unexpectedly been found that deasphalted oil has an enhanced solubilizing power for asphaltene deposits. In fact the solubilizing power of deasphalted oil for asphaltene deposits is close to that of toluene. When asphaltene is removed from crude oil, other components of the oil like resins and aromatics remain in the oil. It is the presence of these components which permits an enhanced solubilizing power of the deasphalted oil for asphaltene deposits. In the case of heavy oil wells, a further advantage is gained with the method of the present invention since the deasphalted oil will not only solubilize asphaltene but also mobilize any formation sand which is trapped in the asphaltene sludge in and around the wellbore and near-wellbore regions. Subsequently, during the production phase, the deasphalted oil along with the mobilized formation sand will be produced. The method of the present invention can therefore be applied to productive wells facing asphaltene deposits problems, or to wells closed because of asphaltene formation in the wellbore or near-wellbore regions.

For the purposes of illustrating the present invention, heavy oil was used as a source of asphaltene to cause damage with regards to permeability in a core taken from a heavy oil formation. The same oil was deasphalted using normal pentane (n-pentane), and used to restore the core permeability by immersing the core therein. Besides the core studies just mentioned, the solubility of precipitated asphaltene in deasphalted oil was also investigated.

The process of solubilizing asphaltene deposits in deasphalted oil can be summarized as follows.

A small volume of deasphalted oil is injected at a pressure lower than the fracture pressure of the reservoir. The volume should be sufficient to penetrate at least 1 meter radially from the wellbore. The thus injected deasphalted oil is then allowed to stand for a soaking of several hours (varying from 1 to 48 hours to solubilize the asphaltene deposits and mobilize the formation sand. Subsequently, the well's production is resumed. After a few days of production, the procedure is repeated with a larger volume of deasphalted oil, typically 2 to 6 times larger, for deeper penetration, preferably 3 meter or more in the reservoir. This procedure is repeated at will thereafter, depending on the response of the well.

With respect to the experimental conditions for field application of the method of the present invention, the following conditions are preferred:

Temperature of injection: 40°-60° C.
Surface injection pressure: 2000–5000 kPa
Volumes of deasphalted oil:
    first stage: about 10 m$^3$
    second stage: about 40 m$^3$
    third stage: about 100 m3

The advantages of the above treatment with deasphalted oil are that when asphaltene is solubilized, the formation sand will be mobilized and suspended in the treatment fluid. The deasphalted oil must have an elevated viscosity in order to be able to suspend the sand and convey it to the surface. In the usual toluene/xylene solvent processes, the viscosity of the toluene/xylene system is less than 1 mPa.s. After treatment in heavy oil wells, severe sanding problems are often encountered in the wellbore. If the deasphalted oil is viscous, the sand will remain in suspension and will be transported to the surface. If the deasphalted oil does not have the proper viscosity then it will loose its capability of suspending sand.

Therefore, the present invention provides a method of overcoming the asphaltene related wellbore and near-wellbore problems for conventional and heavy oil wells concurrently with a procedure for sand suspension and transportation in heavy oil wells using deasphalted oil.

Other examples of deasphalted oils include Heavy Vacuum Gas Oil obtained from the Hydrocracker Fractionation System, or the nominal Gas Oil from the Delayed Coker, which both are well known to those of ordinary skill in the art.

The following examples are provided to illustrate the invention rather than limit its scope.

Example 1

Sample Characterization

The physical properties and chemical composition of the heavy oil sample used in the examples are given in Table 1. As mentioned previously, the deasphalted oil may be of different origins, and the same characteristics for 2 other deasphalted oils are also presented in Table 1. In the following examples, the heavy oil is deasphalted using n-pentane, but other deasphalting solvents well known to those skilled in the art may be used, as long as the components such as aromatics, resins and the like remain in the deasphalted oil after asphaltene extraction. The deasphalting procedure is briefly stated below.

n-pentane is blended with dead oil in a ratio 10:1 to precipitate the asphaltene molecules of the crude oil. The blend is then filtered to remove the suspended asphaltene particles, and n-pentane is evaporated by heating the solid-free filtrate at a temperature slightly above the boiling point of n-pentane. The volume of the filtrate is monitored with time; when equilibrium (no change in volume) is reached, substantially all the pentane is considered to be evaporated, and the deasphalting process is complete. As seen in Table 1, the asphaltene content of the heavy oil is reduced by 92% after deasphalting with n-pentane.

TABLE 1

| Parameters | Sample characteristics | | | |
| --- | --- | --- | --- | --- |
| | Oil | Deasphalted Oil | Heavy Vacuum Gas Oil from hydrocracker Fractionation System | Combined Gas Oil from Delayed Coker |
| Density (g/cc) | 0.965 | 0.946 | 0.911 | 0.862 |
| Viscosity (mPa · s) (at 22° C.) | 10,000–20,000 | 200–3000 | 233 | 16 |
| SARA Analysis | | | | |
| Saturates % (w/w) | 26 | 30 | 42 | 54 |
| Aromatics % (w/w) | 25 | 25 | 44 | 31 |
| Resins I % (w/w) | 19 | 21 | 7 | 7 |
| Resin II % (w/w) | 16 | 23 | 6 | 7 |
| Asphaltenes % (w/w) | 14 | <1 | <1 | <1 |

Solubility Test

Asphaltenes particles precipitated from the heavy oil during the deasphalting process in Example 1 are used for the solubility test in deasphalted oil. The test procedure is as follows.

A known mass of asphaltenes particles are placed on a #10 Whatman ™ filter in a Buchner funnel over a vacuum pump. Deasphalted heavy oil is passed through the filter and the amount of asphaltene particles solubilized is recorded.

Two comparative experiments are carried out. In the first experiment, asphaltene particles are precipitated from crude oil with a conventional condensate fluid comprising various hydrocarbon components. The asphaltene precipitated in an amount of about 5% (0.87 g of asphaltene) by weight (w/w). The deasphalted oil is used again to solubilize the precipitated asphaltene particles. The results show that 25% (w/w) of the asphaltene particles are solubilized at 50° C. and about 90% (w/w) at 75° C.

In the second experiment, asphaltene particles are precipitated using n-pentane. The amount of asphaltene precipitating is about 14% (5.0 g of asphaltene) by weight (w/w). At 50° C., only 3% by weight (w/w) of the asphaltene particles is solubilized. It would appear that the asphaltene particles precipitated with n-pentane favors an irreversible process in contrast to the precipitates obtained from condensate fluids. The results of the core flood studiesin the following example, which uses n-pentane deasphalted oil, however, show excellent solubility of the asphaltene particles which were precipitated using n-pentane.

Example 2

Core Flood Tests

Small core plugs, measuring 3.6 centimeters in length and 3.76 centimeters in diameter, are obtained from full-diameter cores in a conventional manner. The average porosity is about 30% and the initial absolute permeability (i.e., at zero connate-water saturation) to dead oil is about 1800 millidarcies (md). This permeability is considered to be the base permeability, even though slight variations are observed from sample to sample.

The core flood tests are carried out in a core displacement apparatus. The core sample is placed in a heavy lead sleeve. The ductility of the lead sleeve allows a confining overburden pressure to be transferred to the core to simulate reservoir pressure. The core mounted within the lead sleeve is placed inside a steel core holder capable of simulating high reservoir pressure. The pressure is applied by filling the annular space between the lead sleeve and the core holder with simulated formation water and by compressing the water with a hydraulic pump to obtain the desired pressure.

Each core holder end contains two ports, one for fluid feed or production, and the other for pressure measurement. The portions of the core holder directly adjacent to the injection and production ends of the core are equipped with a radial distribution plate to ensure evenly distributed fluid flow in and out of the core specimen.

The pressure differential is monitored using a "VALIDYNE" pressure transducer mounted across the core and measuring the pressure differential between the injection and production ends. Stabilized differential pressures are recorded and used in permeability calculations using Darcy's law.

A "RUSKA" displacement pump is used to inject the fluids into the core. The fluid injection rate is controlled so that the velocity does not increase beyond the critical fluid velocity at which solid migration begins. It is observed that if the fluid velocity exceeds the critical velocity in the core, it can reduce the permeability of the core significantly. Therefore, care must be taken to avoid any permeability damage due to solid movement.

The core is submerged with dead heavy oil at a volumetric flow less than the critical volumetric flow, which is 200 cm³/hr in this case, to establish a baseline permeability after stabilized flow is attained. A small volume of n-pentane is injected into the core and followed by a shut-in period. The n-pentane injection and shut-in period are repeated until the core experiences flow restriction caused by asphaltene precipitation. The core is then submerged with dead oil, light conventional oil, and deasphalted heavy oil sequentially. The end point permeabilities are calculated from measured stabilized differential pressure data.

The results of the core tests are presented in Table 2, which show that the baseline dead oil permeability of the core was about 1800 mD.

TABLE 2

Core Test Results

| Fluid Injection | Cumulative Pore Volume Injection (cm³) | Flow Rate* (cm³/hr) | Viscosity (mPa · s) at 22° C. | Permeability (mD) |
| --- | --- | --- | --- | --- |
| Dead Oil | 16,51 | 5 | 17,700 | 1800 |
| n-pentane with intermittent shut-in | 21,21 | — | — | 350 |
| Dead Oil | 38,40 | 20 | 17,700 | 343 |
| Light conventional oil | 48,63 | 32 | 2 | 541 |
| Deasphalted oil | 59,56 | 32 | 293 | 2299 |

*The critical flow rate for fine migration is about 200 cm³/hr

After several injections of n-pentane into the core, followed each time by a shut-in period, the permeability of the core decreases to 350 mD. Subsequent immersion of the core in dead heavy oil and light conventional oil does not improve the permeability. This is not surprising because the dead heavy oil is saturated with asphaltene and therefore is not able to solubilize further asphaltene particles. On the other hand, the light conventional oil having a viscosity of around 2 mPa.s contains lighter hydrocarbon species, which results in the improvement of the permeability from 350 mD to around 541 mD.

However, as shown in Table 2 above, immersion of the core in deasphalted oil improves the permeability to 2299 mD, which is a significant improvement in permeability. The main explanation for these results is that the deasphalted oil contains constituents like resins, aromatics and the like which enhance the ability of deasphalted oil to solubilize asphaltene particles.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A method for the removal of asphaltene deposits in a well environment, comprising the steps of:
   injecting deasphalted oil in the well environment;
   allowing the deasphalted oil to soak for a period of time sufficient to solubilize the asphaltene deposits; and
   resuming oil production.

2. A method according to claim 1, wherein the well environment is the wellbore or the near-wellbore region.

3. A method according to claim 2, wherein the amount of deasphalted oil injected in the wellbore is sufficient to penetrate at least 1 meter radially from the wellbore.

4. A method according to claim 1, wherein the method is repeated more than once.

5. A method according to claim 1, wherein the deasphalted oil is deasphalted heavy oil, and sand present in the well environment is mobilized by said deasphalted heavy oil.

6. A method according to claim 1, wherein the deasphalted oil is injected at a surface injection pressure of from 2000 to 5000 kPa and at a temperature of from 20° to 100° C.

7. A method according to claim 1, wherein the soaking period varies from 1 to 48 hours.

8. A method according to claim 1 wherein the deasphalted oil is a heavy vacuum gas oil obtained from a hydrocracker fractionation system, or is the nominal gas oil from a delayed coker.

9. A method for the removal of asphaltene deposits in a well environment, comprising the steps of:
   obtaining a sample of crude oil from the well;
   deasphalting the crude oil;
   re-injecting the deasphalted oil in the well environment;
   allow the deasphalted oil to soak for a period of time sufficient to solubilize the asphaltene deposits; and
   resuming oil production.

10. A method according to claim 9, wherein the deasphalting of the crude oil is achieved by inducing precipitation of asphaltene particles, and filtering the oil to remove the asphaltene particles.

11. A method according to claim 10, wherein the precipitation is induced by adding n-pentane to the crude oil.

12. A method according to claim 10, wherein the soaking period varies from 1 to 48 hours.

13. A method according to claim 9, wherein the well environment is the wellbore or the near-wellbore region.

14. A method according to claim 13, wherein the amount of deasphalted oil injected in the wellbore is sufficient to penetrate at least 1 meter radially from the wellbore.

15. A method according to claim 9, wherein the deasphalted oil is injected at a surface injection pressure of from 2000 to 5000 kPa and at a temperature of from 20° to 100° C.

16. A method for preventing the wellbore damages due to asphaltene depositions, which comprises the steps of:
   injecting deasphalted oil in the well environment;
   allowing the deasphalted oil to soak for a period of time sufficient to solubilize the asphaltene deposits; and
   resuming oil production.

17. A method according to claim 16 wherein the deasphalted oil is deasphalted heavy oil, and sand present in the wellbore is mobilized by said deasphalted heavy oil.

18. A method according to claim 16, wherein the deasphalted oil is injected at a surface injection pressure of from 2000 to 5000 kPa and at a temperature of from 20° to 100° C.

* * * * *